United States Patent
Kennan et al.

(10) Patent No.: US 11,286,029 B2
(45) Date of Patent: Mar. 29, 2022

(54) FLIGHT TERMINATION SYSTEM FOR TETHERED AERIAL VEHICLES

(71) Applicant: Aerostar International, Inc., Sioux Falls, SD (US)

(72) Inventors: Mike Kennan, Oakland, CA (US); Vasil Tasovski, Newark, CA (US); Alexander Thal, San Francisco, CA (US)

(73) Assignee: Aerostar International, Inc., Sioux Falls, SD (US)

( * ) Notice: Subject to any disclaimer, the term of this patent is extended or adjusted under 35 U.S.C. 154(b) by 157 days.

(21) Appl. No.: 16/546,370

(22) Filed: Aug. 21, 2019

(65) Prior Publication Data
US 2021/0053667 A1 Feb. 25, 2021

(51) Int. Cl.
*B64B 1/46* (2006.01)
*B64B 1/50* (2006.01)
*B64B 1/62* (2006.01)

(52) U.S. Cl.
CPC ............... *B64B 1/46* (2013.01); *B64B 1/50* (2013.01); *B64B 1/62* (2013.01)

(58) Field of Classification Search
CPC .... B64B 1/18; B64B 1/46; B64B 1/50; B64B 1/62; B64B 1/64; B64B 1/66
See application file for complete search history.

(56) References Cited

U.S. PATENT DOCUMENTS

| | | | | |
|---|---|---|---|---|
| 279,375 | A | * 6/1883 | Geary | B26F 1/32 30/316 |
| 1,589,156 | A | * 6/1926 | Hartman | B26B 5/005 30/294 |
| 3,486,228 | A | * 12/1969 | James | E04D 15/003 30/294 |
| 3,614,031 | A | * 10/1971 | Demboski | B64B 1/48 244/32 |
| 9,296,462 | B1 | 3/2016 | Brookes et al. | |
| 9,463,862 | B2 | 10/2016 | Ratner et al. | |
| 9,643,709 | B1 | 5/2017 | Washburn et al. | |
| 10,059,420 | B1 | 8/2018 | Hall-Snyder et al. | |
| 2016/0207605 | A1 | 7/2016 | Jensen et al. | |

FOREIGN PATENT DOCUMENTS

CN 1231976 A * 10/1999 ............. G09F 21/06

\* cited by examiner

*Primary Examiner* — Joshua J Michener
*Assistant Examiner* — Colin Zohoori
(74) *Attorney, Agent, or Firm* — Schwegman Lundberg & Woessner, P.A.

(57) ABSTRACT

Aspects of the disclosure relate to flight termination systems for tethered aerial vehicles. For instance, a flight termination system for a tethered aerial vehicle including an envelope may include a tool and a tether. The tool may include a first piece configured for attachment to an interior surface of the envelope and including a cutting blade. The tool may also include a second piece configured for attachment to an exterior surface of the envelope. The tether may be attached to the first piece such that when in use, a force on the tether causes the tool to cut an opening into the envelope.

22 Claims, 10 Drawing Sheets

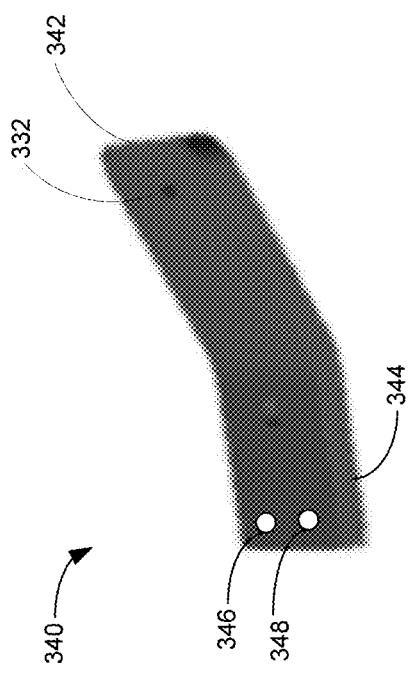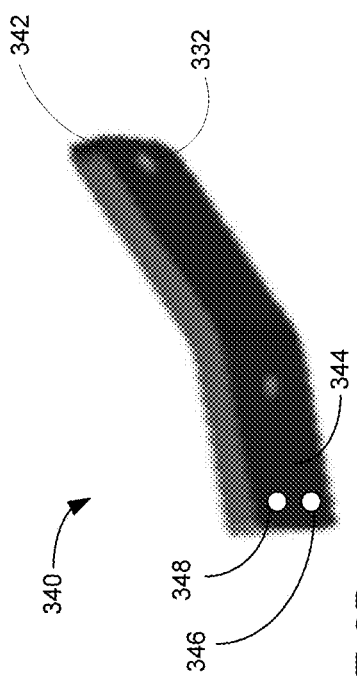
FIGURE 8A
FIGURE 8B

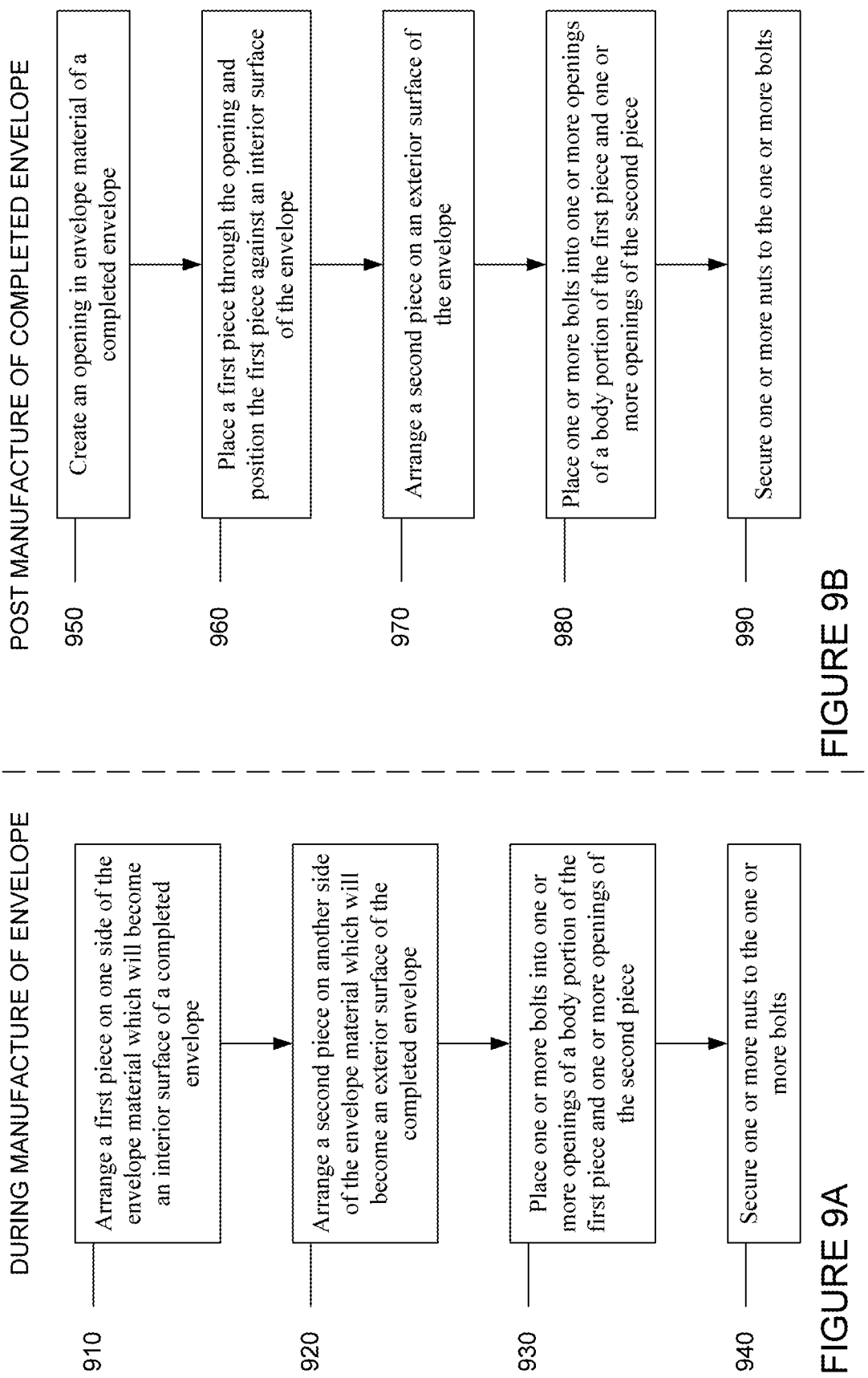

FLIGHT TERMINATION SYSTEM FOR TETHERED AERIAL VEHICLES

BACKGROUND

Tethered aerial vehicles may be employed in various ways, including, for instance, testing features of high-altitude aerial vehicles, such as balloons, closer to the ground. For example, some systems may provide network access via a network including aerial vehicles. To maintain the network, each aerial vehicle may be required to be located at and/or to travel to a particular location, communicate with other aerial vehicles and ground stations, as well as provide network access. In order to ensure that an aerial vehicle will function properly when in use, for instance for testing purposes as noted above, an aerial vehicle may be tethered, or rather, attached to some object on the ground in order to limit their movement relative to the ground. At some point, when these serial vehicles need to be brought back to the ground, doing so quickly and as predictably as possible is critical.

BRIEF SUMMARY

Aspects of the present disclosure are advantageous for high altitude balloon systems. For instance, one aspect of the disclosure provides a flight termination system for a tethered aerial vehicle including an envelope. The system includes a tool including a first piece configured for attachment to an interior surface of the envelope. The first piece includes a cutting blade, and the tool also a second piece configured for attachment to an exterior surface of the envelope. The system also includes a tether attached to the first piece such that when in use, a force on the tether causes the tool to cut an opening into the envelope.

In one example, the second piece includes a handle portion configured such that when the tool is attached to the envelope, the handle portion is angled away from the envelope. In this example, the handle portion is arranged such that when the tool is attached to the envelope, the handle portion overlies the blade. In another example, the second piece further includes a first opening through which the tether is connected. In another example, the second piece includes a connection portion including at least one opening therethrough. In this example, the first piece includes at least one opening therethrough corresponding to the at least one opening of the connection portion. In addition, the system also includes a bolt configured for placement through the at least one opening of the first piece and the at least one opening of the connection portion in order to secure the first piece to the second piece. In this example, the system also includes envelope material corresponding to the envelope, and the bolt is attached to the first piece and the second piece via a nut such that the envelope material is arranged therebetween. In addition, the bolt creates a seal between the envelope material and the first and second pieces. In another example, the system also includes the envelope. In this example, the envelope includes a plate and an eye bolt attached to the plate, and wherein the tether is arranged through the eye bolt. In addition, the plate is a top plate arranged at an apex of the envelope. Alternatively, the plate is a base plate arranged at a base of the envelope. In another example, the tether is long enough to enable an operator at ground level to cause the force by pulling on the tether. In another example, the system also includes as a motorized winch system to which the tether is attached, and wherein the motorized winch system is configured to create the force. In another example, the tether is configured to be pulled manually by an operator in order to create the force. In another example, the first piece includes a pair of wing portions that extend laterally from a body portion of the first piece such that when in use, the wing portions are arranged to assist the tool in sliding along the interior surface. In another example, the first piece includes a pair of wing portions that extend laterally from a body portion of the first piece such that when in use, the wing portions reduce a likelihood of the tool falling out of the envelope.

Another aspect of the disclosure provides a method for terminating flight of a tethered aerial vehicle having an envelope. The method includes causing a force on a tether attached to a flight termination tool. The tool includes a first piece attached to an interior surface of the envelope, a cutting blade, and a second piece attached to an exterior surface of the envelope. The method also includes using the force on the tether to cause the blade to create an opening in the envelope in order to terminate flight of the tethered aerial vehicle. In one example, the tether is arranged through an eye bolt at a plate of the envelope, and causing the force includes pulling at least a portion of the tether through the eye bolt.

BRIEF DESCRIPTION OF THE DRAWINGS

FIGS. 8A and 8B are example views of a second piece in accordance with aspects of the disclosure.

FIGS. 9A and 9B are example flow diagrams in accordance with aspects of the disclosure.

DETAILED DESCRIPTION

Overview

Figure 1:
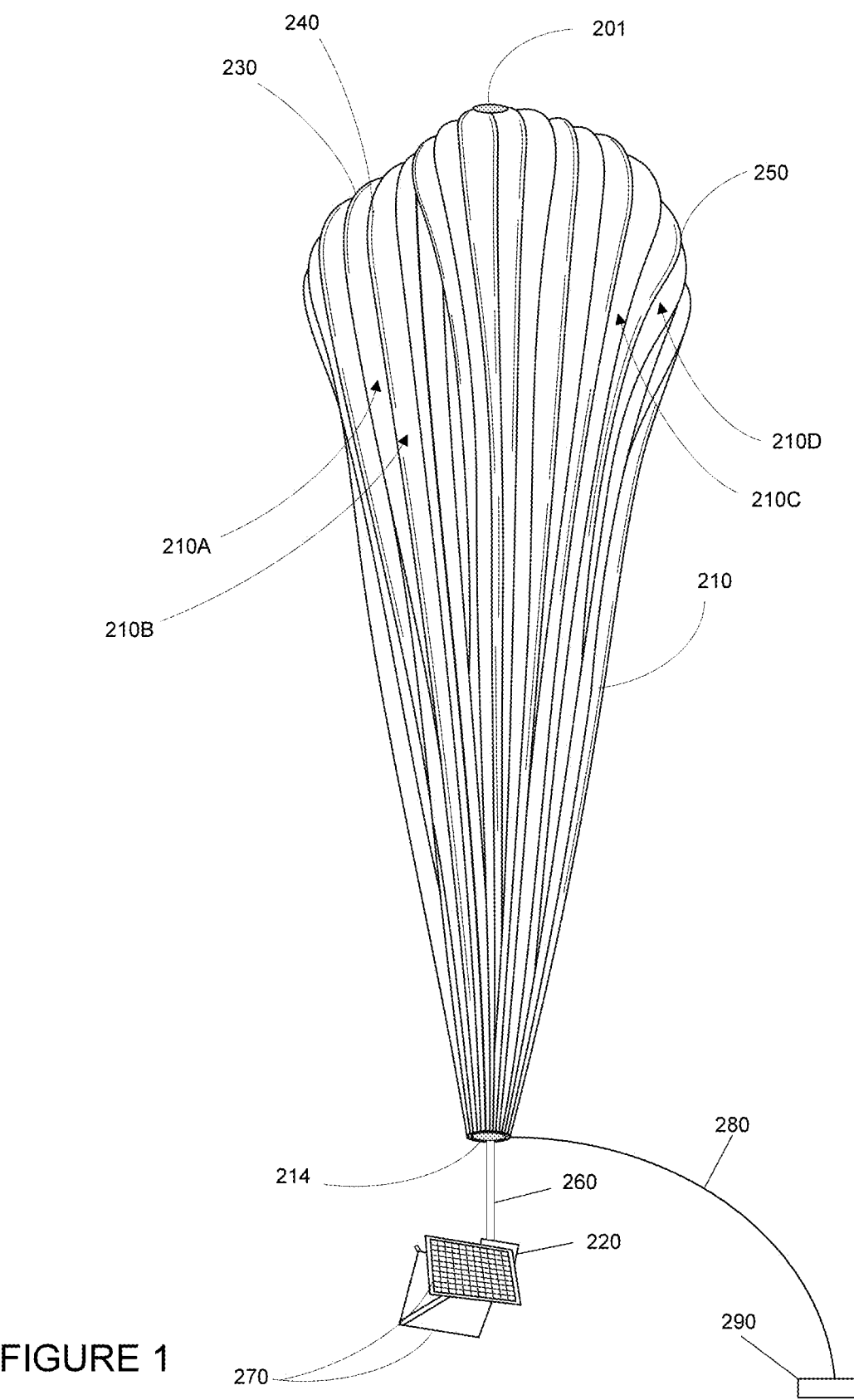
FIG. 1 is an example of an aerial vehicle in accordance with aspects of the present disclosure.

The present disclosure generally relates to providing system for terminating a flight of a tethered balloon having an envelope. Tethered balloons may be employed in various ways, including, for instance, testing features of high-altitude balloons closer to the ground. At some point, when these balloons need to be brought back to the ground, doing so quickly and as predictably as possible is critical. The techniques and features described herein may allow a user on the ground to activate a flight termination system attached to the balloon that causes the envelope to release its lift gas in a manner that allows the balloon to descend back to Earth.

The flight termination system may include a cutdown tool and a tether. One end of the tether may be attached to the cutdown tool, for instance, via an opening in the cutdown tool. The tether of the flight termination system may be a different tether from the one that keeps the balloon from floating away. In order to enable the tool to create an opening in the envelope material, the tether may be connected to a top or bottom plate of the envelope in order to provide a consistent direction of a pulling force by the tether.

The tool may include first and second pieces. The first piece may be configured to be mounted internally to the envelope. The first piece may include a body portion having ends of which are generally oriented towards one of a respective top plate and bottom plate of the balloon. A first end of the body portion may terminate in a curved, rounded or chamfered edge in order to avoid snagging or catching on the envelope material. A second end of the body portion includes a slit with a blade arranged within the slit. Adjacent to the blade on the body portion is a mounting projection with one or more openings therethrough for placing bolts. The first piece may also include a pair of wing portions which extend laterally from the body portion. The second piece of the tool may include a handle portion which overlies the blade and a connection portion including a corresponding one or more openings therethrough for placing bolts.

The tool may be installed during manufacturing of the envelope or post manufacturing of a completed envelope. Under normal conditions, the tool would not cut the envelope material. However, after the balloon is filled and launched, when a certain amount of force is applied to the tether, the tool may begin cutting the envelope material. The force of the tether pulling on the tool may cause the bolts to rip through the envelope material and the blade to create an opening in the envelope material.

The features described herein may enable termination of a flight of a tethered balloon in a simple and effective way. Terminating the flight of a tethered balloon can have significant safety implications. However, because the tether pulling on the tool creates an opening in the envelope quickly, the balloon is more likely to fall to the ground immediately in a more predictable way which may minimize risk to other objects around the balloon.

Example Aerial Vehicle

FIG. 1 is an example aerial vehicle 200 which may be a balloon. Of course, other aerial vehicles may also be tested using tethers. As shown, the aerial vehicle 200 includes an envelope 210, a payload 220 and a plurality of tendons 230, 240 and 250 attached to the envelope 210. The envelope 210 may take various forms. In one instance, the envelope 210 may be constructed from materials (i.e. envelope material) such as polyethylene that do not hold much load while the aerial vehicle 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of aerial vehicle 200 may be affixed to the envelope by a connection 260 such as a cable or other rigid structure. The payload 220 may include a computer system (not shown), having one or more processors and on-board data storage. The payload 220 may also include various other types of equipment and systems (not shown) to provide a number of different functions. For example, the payload 220 may include various communication systems such as optical and/or RF, a navigation software module, a positioning system, a lighting system, an altitude control system (configured to change an altitude of the aerial vehicle), a plurality of solar panels 270 for generating power, a power supply (such as one or more batteries) to store and supply power to various components of aerial vehicle 200.

In view of the goal of making the envelope 210 as lightweight as possible, it may be comprised of a plurality of envelope lobes or gores that have a thin film, such as polyethylene or polyethylene terephthalate, which is lightweight, yet has suitable strength properties for use as a envelope. In this example, envelope 210 is comprised of envelope gores 210A-210D.

Pressurized lift gas within the envelope 210 may cause a force or load to be applied to the aerial vehicle 200. In that regard, the tendons 230, 240, 250 provide strength to the aerial vehicle 200 to carry the load created by the pressurized gas within the envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top plate 201 positioned at the apex of envelope 210. A corresponding apparatus, e.g., bottom plate 214, may be disposed at a base or bottom of the envelope 210. The top plate 201 at the apex may be the same size and shape as and bottom plate 214 at the bottom. Both caps include corresponding components for attaching the tendons 230, 240 and 250 to the envelope 210.

Figure 2:
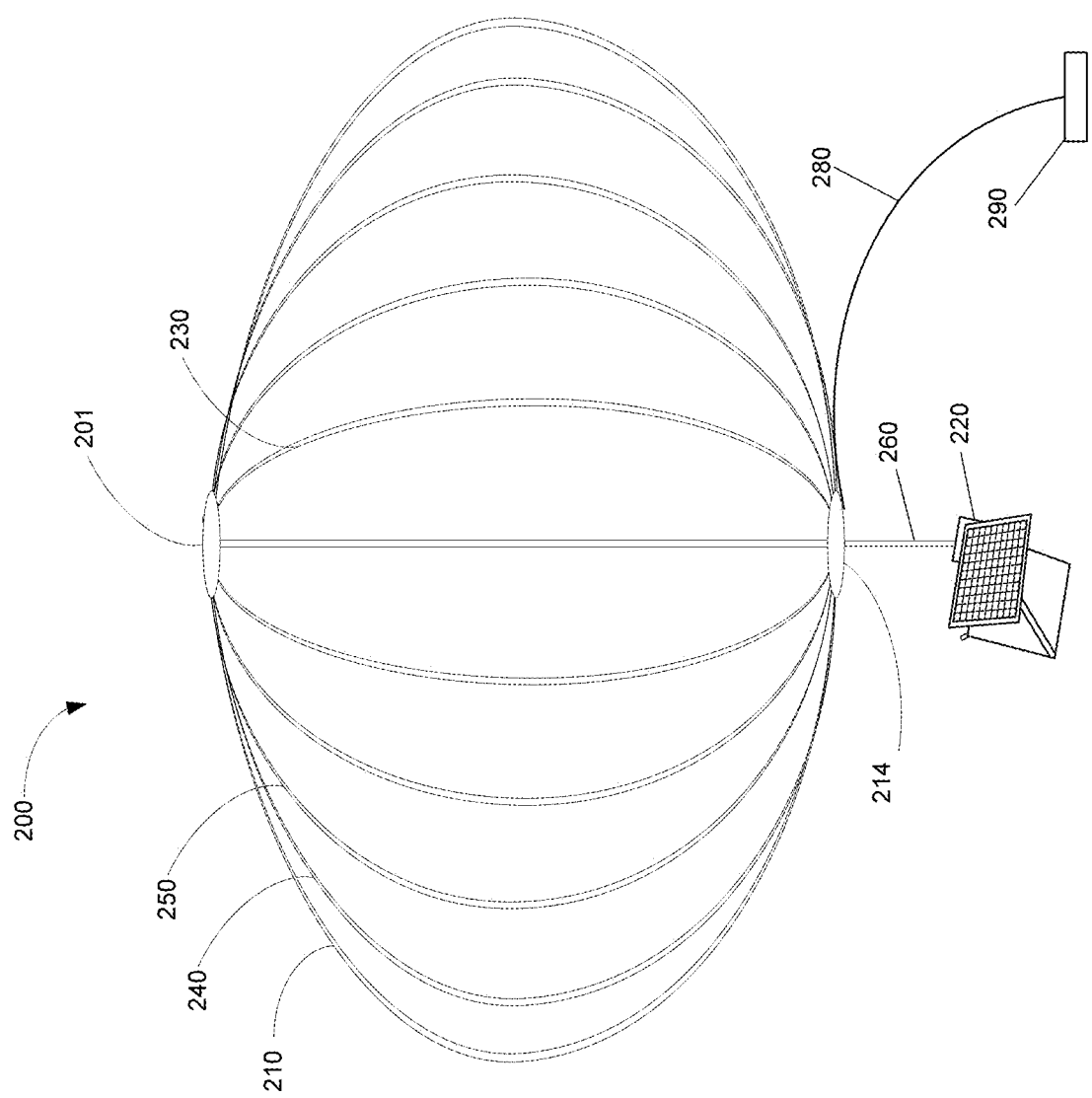
FIG. 2 is an example of an aerial vehicle in flight in accordance with aspects of the disclosure.

FIG. 2 is an example of aerial vehicle 200 in flight when the envelope 210 is pressurized. In this example, the shapes and sizes of the envelope 210, connection 260, and payload 220 are exaggerated for clarity and ease of understanding. During flight, these aerial vehicles may use changes in altitude to achieve navigational direction changes. For example, the altitude control system of the payload 220 may cause air to be pumped into a ballast within the envelope 210 which increases the mass of the aerial vehicle and causes the aerial vehicle to descend. Similarly, the altitude control system may cause air to be released from the ballast (and expelled from the aerial vehicle) in order to reduce the mass of the aerial vehicle and cause the aerial vehicle to ascend.

In both FIGS. 1 and 2, a tether 280 is attached to the aerial vehicle 200. The tether 280 may be attached to an anchor 290 or other object at ground level or on a ground surface of the Earth. This tether may be long enough to enable the aerial vehicle to ascend to altitudes where the aerial vehicle is able to pressurize while keeping the aerial vehicle from floating away.

Example Flight Termination System

Figure 3:
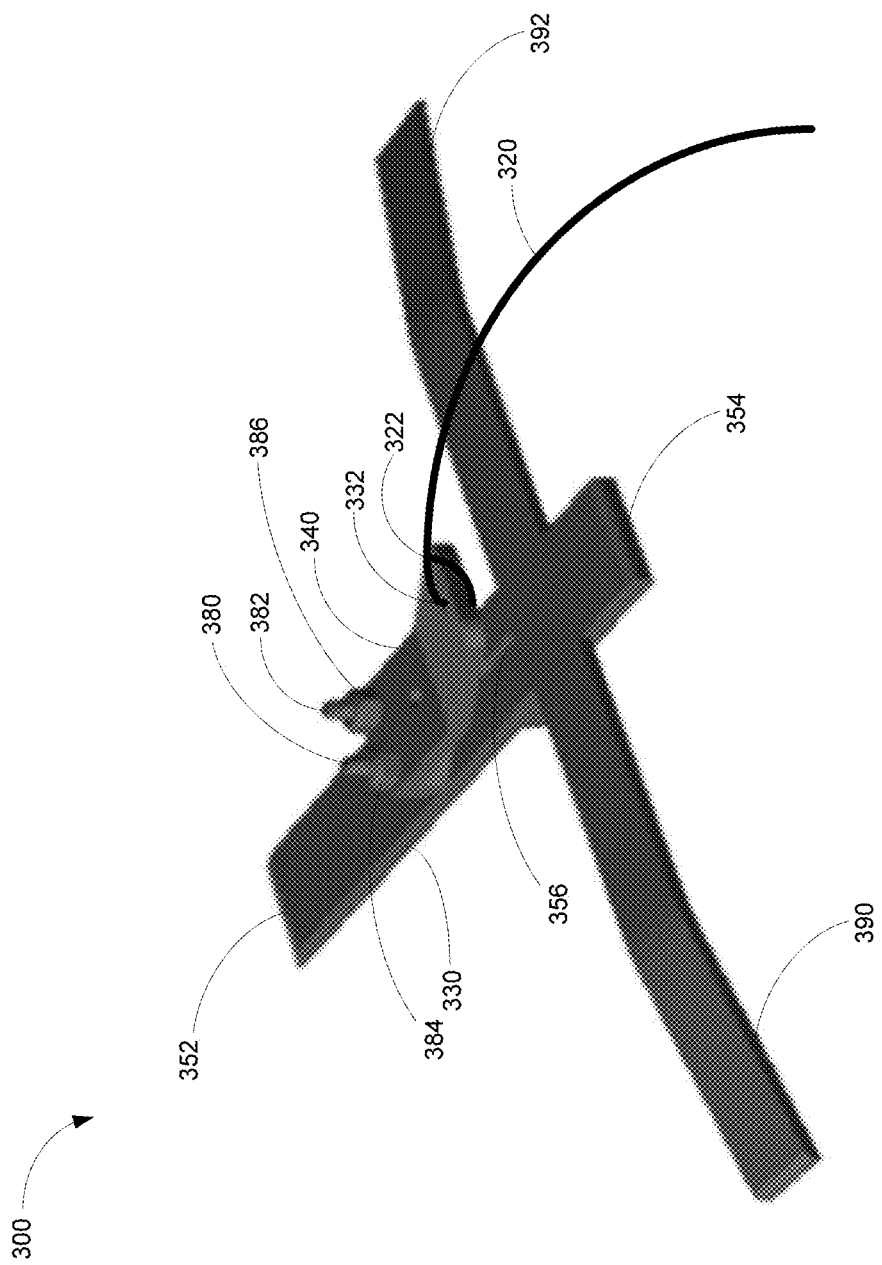
FIG. 3 is an example view of a flight termination system in accordance with aspects of the disclosure.
Figure 4:
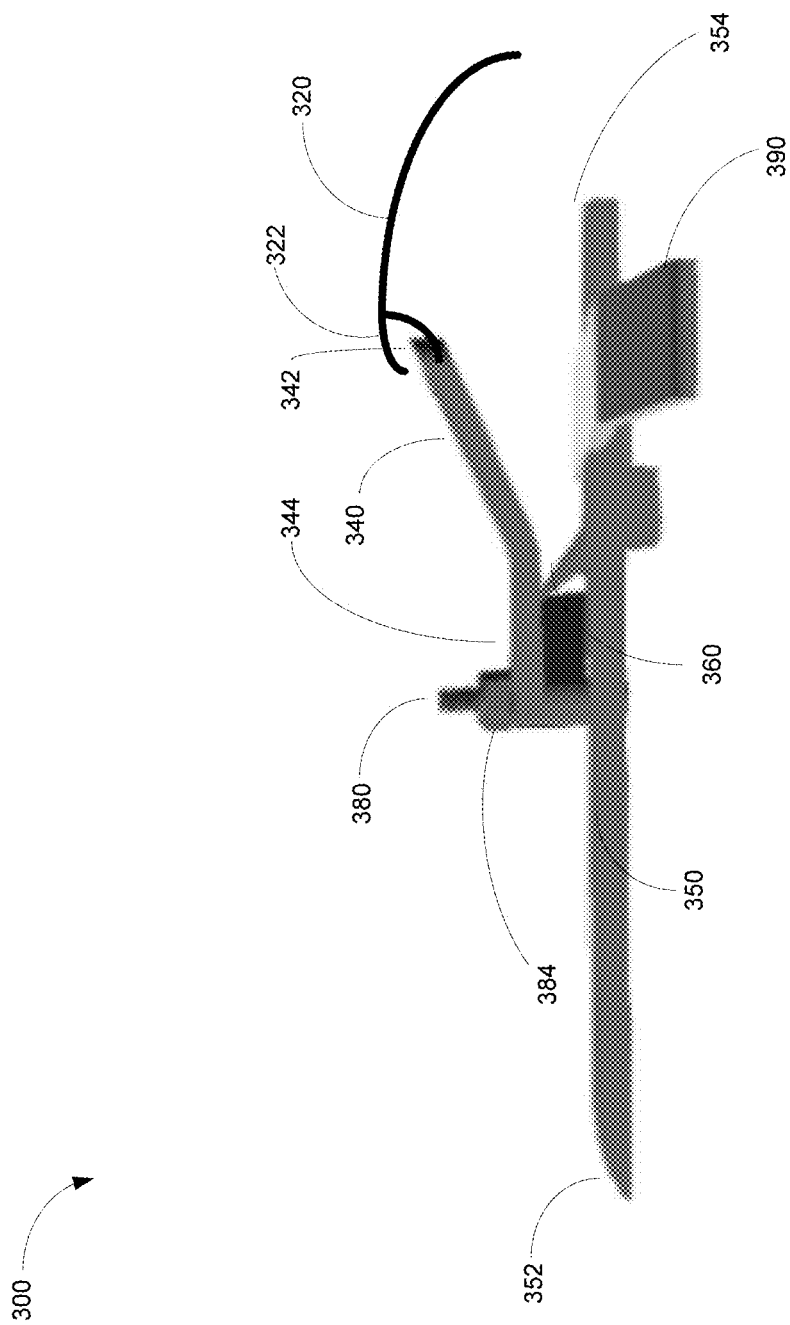
FIG. 4 is an example view of a flight termination system in accordance with aspects of the disclosure.

As noted above, in order to enable an operator to termination flight of a tethered aerial vehicle, a flight termination system may be used. FIGS. 3 and 4 are views of a flight termination system 300. The flight termination system 300 may include a cutdown tool 310 and a tether 320. One end 322 of the tether 320 may be attached to the tool 310, for instance, via an opening 332 in the cutdown tool. The tether 320 of the flight termination system may be a different tether from the tether 280 that keeps the aerial vehicle from floating away. The tether 320 may be a rope, cord, or other length of material that does not put too much weight on the balloon during normal use (i.e. does not prevent the balloon from rising away from the ground surface).

Figure 5:
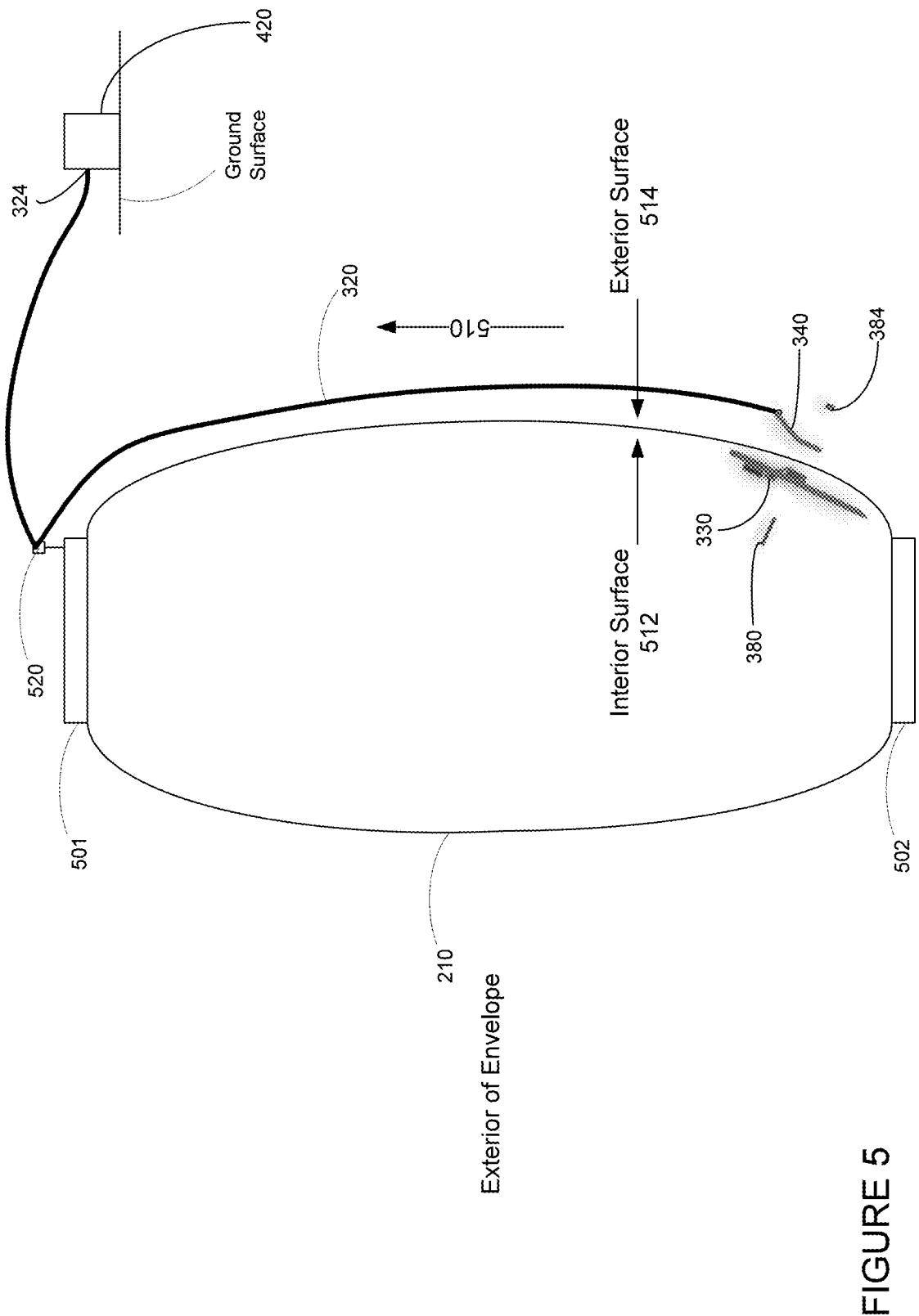
FIG. 5 is an example view of a flight termination system and portion of an aerial vehicle in accordance with aspects of the disclosure.

As shown in FIG. 5, the flight termination system 300 may be mounted to the envelope 210 between two plates 501, 502. For ease of understanding, the size of the flight termination system 300 relative to the envelope 210 is greatly exaggerated, the length of the tether between the plate 501 and ground surface is also significantly reduced, and the location of the ground surface relative to the envelope is arbitrary. In addition, aspects of the tool 310, including bolt 380, first piece 330, second piece 340, and nut 384 are depicted as "broken out" in order to depict the relative locations of the various aspects.

In order to enable the tool 310 to create an opening in the envelope 210, the tether 320 may be connected to a top plate 201 or bottom plate 214 of the envelope 210 in order to provide a consistent direction of a pulling force by the tether 320. In one instance, the tether 320 may be arranged through an eye bolt 520 arranged on plate 501. Alternatively, rather than an eye bolt, the tether 320 may be connected to a motorized spring retraction device or solenoid with a receiver configured to activate a pulling force and/or wind the tether and cause the tool to create the opening.

If the tether 320 is attached at the top plate 201 (i.e. plate 501 represents the top plate 201), the tool 310 may be arranged to cut an opening in a downward direction (i.e. arrow 510 would point towards the ground surface). If the tether 320 is attached at the bottom plate 214 (i.e. plate 501 represents the bottom plate 214), the tool 310 may be arranged to cut an opening in an upward direction (i.e. arrow 510 would point away from the ground surface).

In one example, the tether 320 may be long enough to extend to the ground surface so as to enable an operator or other machine such as a motorized winch system to pull on the tether to create an opening in the envelope. In this regard, as show in FIG. 5, a second end 324 of the tether 320 is attached to a motorized winch system 420 which may be located at the ground surface.

Figure 6B:
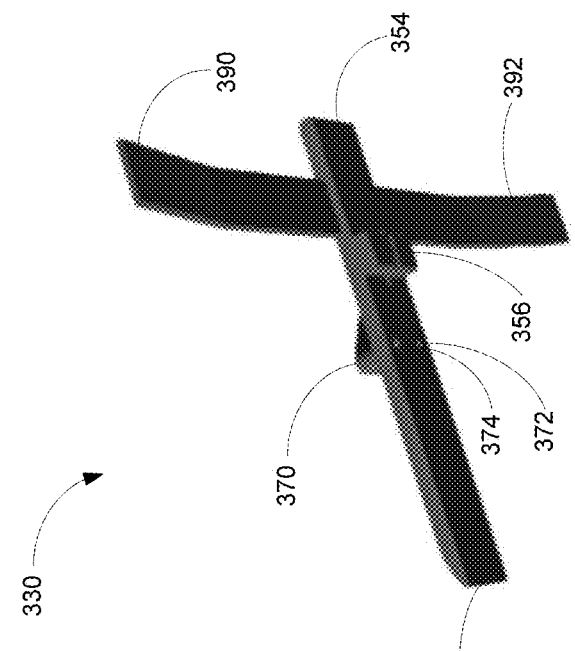
FIGS. 6A and 6B are example views of a first piece in accordance with aspects of the disclosure.
Figure 6A:
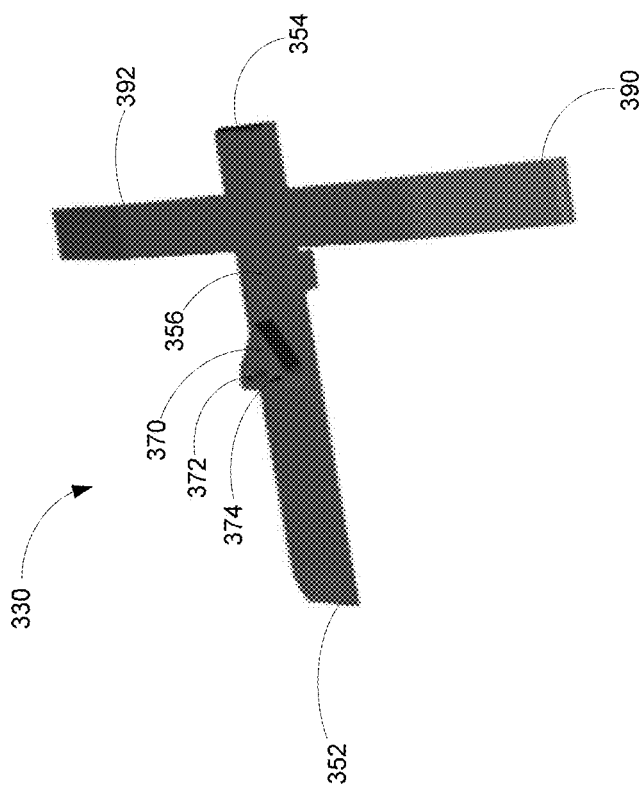
Figure 7:
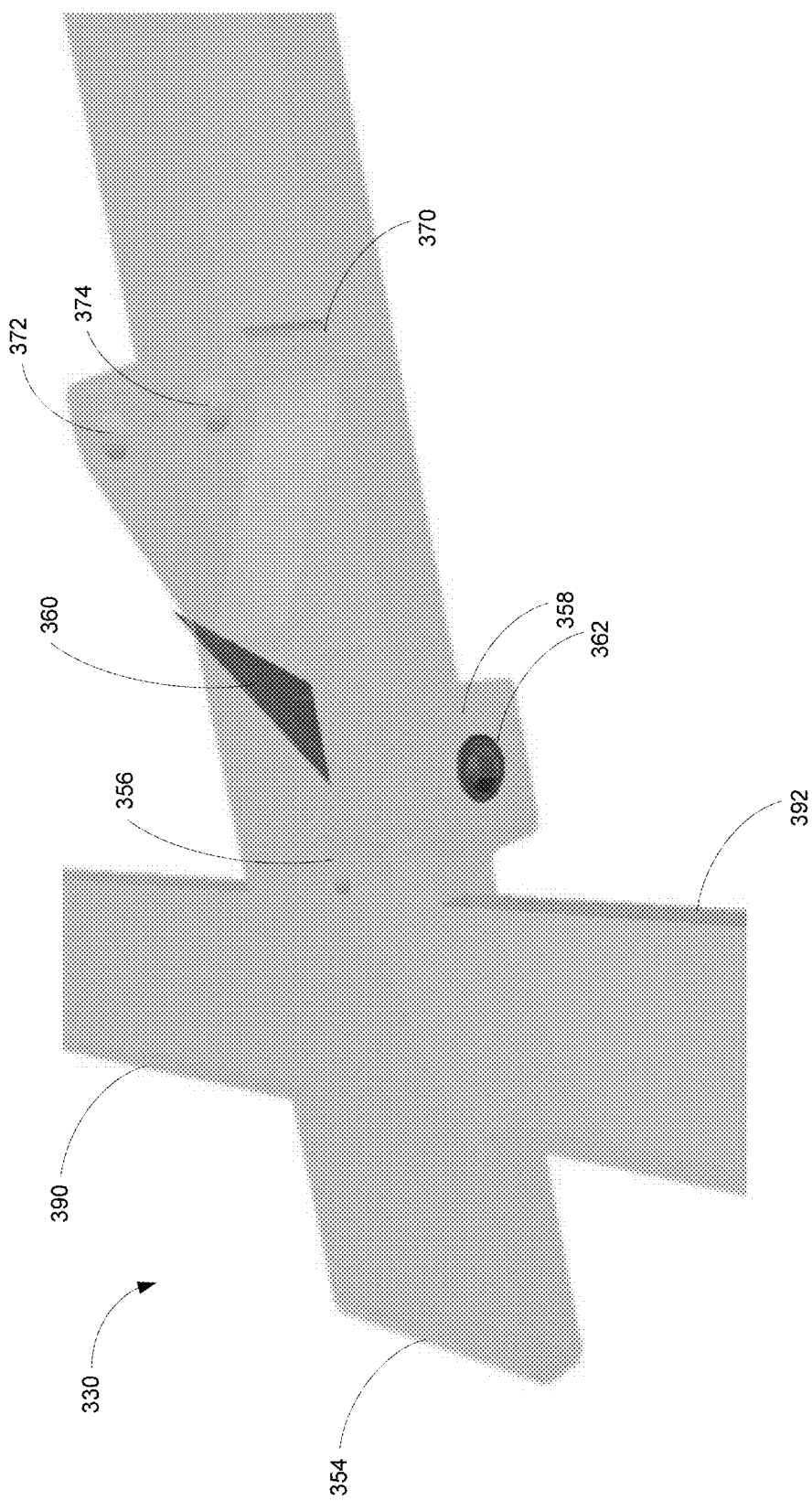
FIG. 7 is an example detail view of a portion of a first piece in accordance with aspects of the disclosure.

Returning to FIG. 3, the tool may include first and second pieces 330, 340. FIGS. 6A and 6B are example views of the first piece 330. The first piece 330 may be configured to be mounted internally to the envelope 210 as shown in FIG. 5. The first piece 330 may include a body portion 350 having ends 352, 354 of which are generally oriented towards one of a respective top plate 201 and bottom plate 214 of the aerial vehicle 200. A first end 352 of the body portion may terminate in a curved, rounded or chamfered edge in order to avoid snagging or catching on the envelope material. Between the first end 352 and the second end 354 of the body portion 350 includes a slit 356 with a blade 360 arranged within the slit. Turning to FIG. 7 which provides a detail view of the first piece 330, the blade 360 may be secured in the slit by a threaded bolt 362, screw or other device arranged in an opening in a side surface 358 of the body portion 350. The shape of the blade 360 may be selected based upon the envelope material. For example, some materials may slice with a sharp blade more easily than others. Adjacent to the blade 360 on the body portion 350 is a mounting projection 370 with one or more openings 372, 374 therethrough for placing bolts 380, 382. The first piece 330 may also include a pair of wing portions 390, 392 which extend laterally from the body portion 350.

FIGS. 8A and 8B are perspective views of the second piece 340. The second piece 340 of the tool 310 may include a handle portion 342 which overlies the blade 360 (shown in FIGS. 3 and 4) and a connection portion 344 including a corresponding one or more openings 346, 348 therethrough for placing the bolts 380, 382.

As depicted in the example flow diagrams of FIGS. 9A and 9B, the tool 310 may be installed during manufacturing of an envelope or post manufacturing of a completed envelope. For instance, turning to FIG. 9A, prior to completion of the envelope 210, as shown in block 910, the first piece 330 may be arranged on one side of the envelope material which will become an interior surface 512 of the completed envelope 210, and as shown in block 920 the second piece 340 may be arranged on another side of the envelope material which will become an exterior surface 514 of the completed envelope. At block 930, one or more bolts 380, 382 may be placed into the one or more openings 372, 374 of the body portion 350 and the one or more openings 346, 348 of the second piece. As shown in FIG. 5, the bolts may be placed through the one or more openings from the interior of the envelope 210, such that they pass through the envelope 210 from the interior surface towards the exterior surface. The bolts 380, 382 may simply punch through the envelope material or one or more prearranged cuts may be made in the envelope material in order to allow the bolts to more easily pass through the envelope material. Thereafter, one or more washers may be placed on the one or more bolts, and, as shown in block 940, one or more nuts 384, 386 (see, e.g. nut 384 of FIG. 5) may be secured to the one or more bolts (external to the envelope 210 as shown in FIG. 5). At this point, the envelope material may be sandwiched between the first and second pieces 330, 340, and the bolts 380, 382 may provide an airtight or nearly airtight seal with the envelope material.

Alternatively, turning to FIG. 9B at block 950, an opening may be created, such as by punching or slicing into the envelope material of a completed envelope, for example, where the envelope 210 and gores are completed and have already been attached to the top and bottom plates 201, 214. At block 960, the first piece 330 may be placed through the opening, and positioned against the interior surface 512 of the envelope 210. At block 970, the second piece 340 may be placed on the exterior surface 5145 of the envelope 210, and as shown in block 980 and 990, the bolts 380, 382, washers, and nuts 384, 386 may be installed as described above. Thereafter, the opening created in the envelope material of the completed envelope may be closed, for instance by heat sealing a patch of additional envelope material over the opening.

Under normal conditions, the tool 310 would not cut the envelope material. However, after the envelope of the aerial vehicle is filled and the aerial vehicle is launched, when a certain amount of force is applied to the tether 320, for instance by pulling on the tether 320 manually or using the motorized winch system, the tool 310 may begin cutting the envelope material of the envelope 210. The force of the tether 320 pulling on the tool 310 may cause the bolts 380, 382 to rip through the envelope material and the blade 360 to create an opening in the envelope material. Eventually, the one or more bolts 380, 382 would be released from the envelope material when the one or more openings 346, 348, 372, 374 of the first and second pieces meet the opening created by the blade 360. The cutting action may continue for as long as force is applied.

Figure 10:
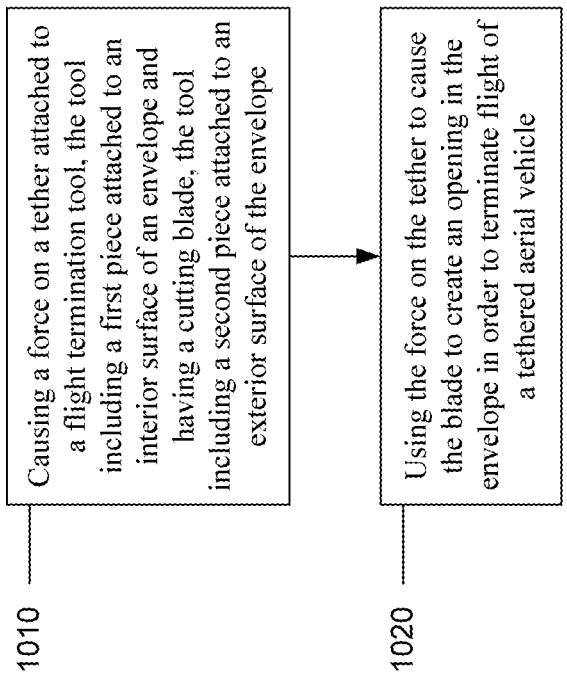
FIG. 10 is an example flow diagram in accordance with aspects of the disclosure.

For example, FIG. 10 is an example flow diagram for terminating flight of a tethered aerial vehicle having an envelope, such as aerial vehicle 200 having envelope 210. In this example, at block 1010, a force is caused on a tether, such as tether 320, attached to a flight termination tool, such as tool 310. In this example, the tool including a first piece, such as the first piece 330, attached to an interior surface of the envelope and having a cutting blade and a second piece, such as second piece 340, attached to an exterior surface of the envelope. This may be achieved, for instance, by an operator pulling on the tether 320 manually or, for instance, by using the motorized winch system 420. At block 1020, the method also includes using the force on the tether to cause the blade to create an opening in the envelope in order to terminate flight of the tethered aerial vehicle.

When in use, the handle portion 342 of the second piece 340 may be angled away from the envelope 310 which may reduce or prevent interference of the tether 320 and handle portion 342 with the envelope material during use. In addition, the shape of the handle portion 342 may increase cutting forces as the handle portion may provide some leverage to the point of engagement with the envelope material.

When in use, the wing portions 390, 392 of the first piece 330 may assist the first end 352 of the body portion 350 to slide along the interior surface of the envelope 210 and reduce a likelihood of the tool 310 "falling out" or off of the envelope 210 while cutting. In some instances, the tool 310 may remain engaged with the envelope material even when at the end of its travel along the envelope 210. The wing portions 390, 392 may also prevent envelope material from bunching up against the blade 360 as the tool 310 cuts open the envelope material. As such, the wing portions 390, 392 may provide greater stability during use of the tool.

The features described herein may enable termination of a flight of a tethered aerial vehicle in a simple and effective way. Terminating the flight of a tethered aerial vehicle can have significant safety implications. However, because the tether pulling on the tool creates an opening in the envelope quickly, the aerial vehicle is more likely to fall to the ground immediately in a more predictable way which may minimize risk to other objects around the balloon.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A flight termination system for an aerial vehicle including an envelope, the system comprising:
   a tool configured to cut an envelope of the aerial vehicle, the tool includes:
      a first piece configured for attachment to an interior surface of the envelope, the first piece further including a cutting blade; and
      a second piece configured for attachment to an exterior surface of the envelope; and
   an eye bolt configured for coupling with a plate of the envelope;
   a tether coupled to the second piece, the tether extends through the eye bolt; and
   wherein the tool is configured to transition to a flight termination configuration with a force applied to the tether that pulls at least a portion of the tether through the eye bolt, the tether moves the tool toward the eye bolt, and the cutting blade cuts the envelope of the aerial vehicle.

2. The system of claim 1, wherein the second piece includes a handle portion configured such that when the tool is attached to the envelope, the handle portion is angled away from the envelope.

3. The system of claim 2, wherein the handle portion is arranged such that when the tool is attached to the envelope, the handle portion overlies the blade.

4. The system of claim 1, wherein the second piece further includes a first opening through which the tether is connected.

5. The system of claim 1, wherein the second piece includes a connection portion including at least one opening therethrough.

6. The system of claim 5, wherein the first piece includes at least one opening therethrough corresponding to the at least one opening of the connection portion.

7. The system of claim 6, further comprising a bolt configured for placement through the at least one opening of the first piece and the at least one opening of the connection portion in order to secure the first piece to the second piece.

8. The system of claim 1, further comprising the envelope having the plate.

9. The system of claim 8, further comprising envelope material corresponding to the envelope, and wherein the bolt is attached to the first piece and the second piece via a nut such that the envelope material is arranged therebetween.

10. The system of claim 9, wherein the bolt creates a seal between the envelope material and the first and second pieces.

11. The system of claim 8, wherein the plate is a top plate arranged at an apex of the envelope.

12. The system of claim 8, wherein the plate is a base plate arranged at a base of the envelope.

13. The system of claim 1, wherein the tether is long enough to enable an operator at ground level to cause the force by pulling on the tether.

14. The system of claim 1, further comprising as a motorized winch system to which the tether is attached, and wherein the motorized winch system is configured to create the force.

15. The system of claim 1, wherein the tether is configured to be pulled manually by an operator in order to create the force.

16. The system of claim I, wherein the first piece includes a pair of wing portions that extend laterally from a body portion of the first piece such that when in use, the wing portions are arranged to assist the tool in sliding along the interior surface.

17. The system of claim 1, wherein the first piece includes a pair of wing portions that extend laterally from a body portion of the first piece such that when in use, the wing portions reduce a likelihood of the tool falling out of the envelope.

18. A method for terminating flight of an aerial vehicle having an envelope, the method comprising:
   pulling at least a portion of a tether through an eye bolt, the eye bolt at a plate coupled with the envelope of the aerial vehicle;
   causing a force on the tether attached to a flight termination tool according to the pulling, the tool including a first piece attached to an interior surface of the envelope, the tool including a cutting blade, and the tool including a second piece attached to an exterior surface of the envelope; and using the force on the tether to cause the blade to create an opening in the envelope in order to terminate flight of the tethered aerial vehicle.

19. The method of claim 18, wherein using the force on the tether to cause the blade to create the opening includes moving the tool and the cutting blade toward the eye bolt.

20. The method of claim 19, wherein the plate includes a top plate, and moving the tool and the cutting blade toward the eye bolt includes moving the tool and the cutting blade from proximate a bottom plate toward the top plate.

21. The method of clam 18, wherein using the force on the tether to cause the blade to create the opening includes:

moving the first piece along the interior surface of the envelope; and moving the second piece along the exterior surface of the envelope.

22. The method of claim 18, wherein the tool in a flight termination configuration is moved from proximate a bottom of the envelope toward a top of the envelope having the plate.

\* \* \* \* \*